C. BREMAKER.
Engine for Preparing Stock for Making Paper-Pulp.

No. 216,505. Patented June 17, 1879.

WITNESSES.
Frank Pardon.
Wm. T. Ross.

INVENTOR.
Charles Bremaker
by J. G. Hewitt
Attorney

UNITED STATES PATENT OFFICE.

CHARLES BREMAKER, OF LOUISVILLE, KENTUCKY.

IMPROVEMENT IN ENGINES FOR PREPARING STOCK FOR MAKING PAPER-PULP.

Specification forming part of Letters Patent No. 216,505, dated June 17, 1879; application filed March 3, 1879.

*To all whom it may concern:*

Be it known that I, CHARLES BREMAKER, of the city of Louisville, in the county of Jefferson and State of Kentucky, have invented a certain new and useful Improvement in Engines for Preparing Stock for Making Paper-Pulp; and I do hereby declare that the following is a full, clear, and exact description of the construction and operation of the same, reference being had to the accompanying drawings, forming part of this specification, and to the letters of reference marked thereon.

Figure 1:
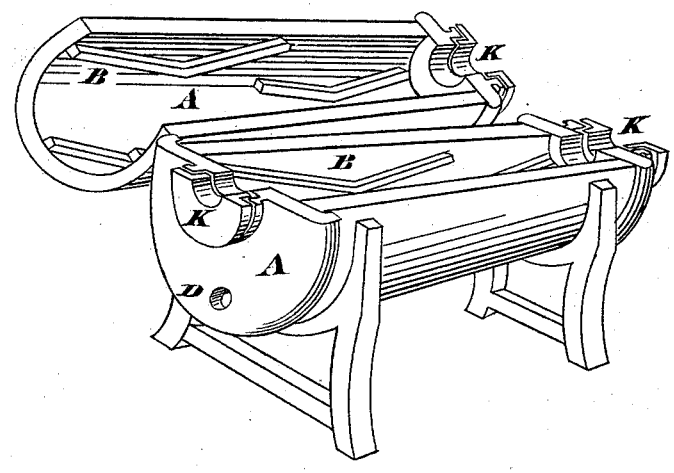
Figure 2:
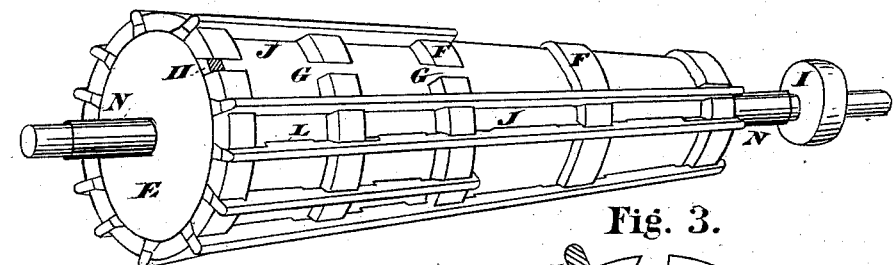
Figure 4:
Figure 5:
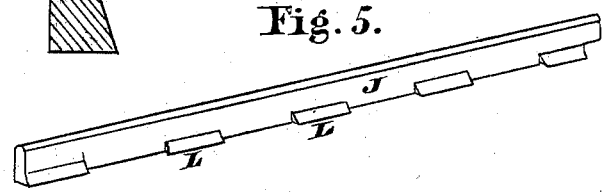
Figure 3:
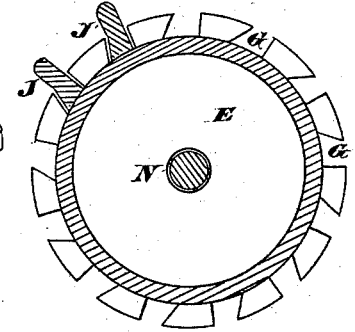

Figure 1 is a perspective view of the interior shell or casing of the knife-roll, showing the arrangement of the knives therein. Fig. 2 is a perspective view of the central roll or nut, showing how the knives are inserted therein. Fig. 3 is a sectional view of the knife-roll, showing the raised rings thereon and the manner of inserting the knives. Fig. 4 is a sectional view of the knife, showing the form of the dovetail and blade. Fig. 5 is a perspective view of the knife, showing the dovetails and reduced portions between them.

Similar letters of reference indicate corresponding parts of the drawings.

This my invention relates to a certain new and useful improvement in Gordon engines for preparing stock for making paper-pulp, but more especially in the peculiar construction of the knives and the manner of inserting and securing them in the roll, which consists, first, in a knife about one and three-fourths inch wide and one-eighth of an inch thick, with raised dovetails on one or both sides, to correspond with the bearings or grooves in the rings of the roll, but without parallel taper or wedge form; and in order to insert them in the grooves a recess is cut in the dovetail between the bearing sufficient to permit them to drop into the grooves loosely, and when pressed up into the grooves from the small end of the roll they are held firmly by the centrifugal force caused by the action of the machine, without parallel taper or wedge form to assist in holding them, they being prevented from slipping out at the large end of the roll by means of a stop-shoulder in the groove.

The great advantages claimed for knives formed and inserted in the above-described manner are, that they can be made much cheaper, and by means of the recess or reduction of the dovetails between the bearings they can be dropped into the grooves, and by sliding them up from two to four inches into the grooves they are held firmly without taper or wedge form to assist, and when necessary they may be easily removed when required; but with most of the machines now in use the knives are made with a tapered dovetail extending their entire length, with a corresponding groove in the roll, into which they are driven from the large end of the roll, and after remaining for some time and getting thoroughly rusted, it is almost impossible to take them out in repairing, thereby causing much loss of time and trouble.

This my invention is more fully illustrated in detail in Figs. 1, 2, 3, 4, and 5 of the drawings, in which A A represent the outer shell or casing of the machine, which is made in form as shown in the drawings. B B are the knives in the casing, and K K are the packing-boxes by means of which the shaft is rendered water-tight, a similar device being used at each end, although not fully shown in the drawings. D is the discharge-opening for the pulp. E is the interior roll or nut, which is made in form as shown, with raised rings F F at intervals, to answer as bearings to hold the knives. G G are dovetail grooves cut in the rings F F, to receive and hold the knives. H is a stop-block in the grooves G at the end of the roll, to prevent the knives from slipping out, the pressure being at all times in that direction. I is the driving pulley and shaft, which, when put together, works in the bearings K K of the shell A, which completely incloses it, so as to permit the knives to pass each other closely as it revolves, thereby reducing the paper-stock to a finer pulp. N N are collars or sleeves, made of composition metal, shrunk firmly on the journal-bearings of the shaft I, where they work in the packing, to prevent corrosion by the chemicals used in the pulp, which pass through the engine. J J are the knives, which are made of steel, about one and three-fourths inch wide and one-eighth of an inch thick, rolled with a continuous dovetail on the side, without parallel taper or wedge form; and in order to insert them in the grooves of the roll, a recess is cut in the dovetail between the bearings sufficient to permit them to drop in loosely, and by sliding them up two or more inches into the grooves, or until they rest against the stop-block H, they will be held firmly by the pressure of the machine in that direction, without parallel taper to assist in holding them, and when necessary may be easily removed for repairs without loss of time.

I am aware that knives for the Gordon engines have been made with a continuous dovetail on the side formed by planing, and secured in the roll by inserting it in a corresponding groove cut the entire length of the roll or knives; but nearly all the knives heretofore used have the dovetails made tapering or in wedge form and driven into the groove from the large end of the roll, each knife having to be driven in its entire length, and after remaining for some time they get thoroughly rusted, when it is almost impossible to remove them for repairs; but so far as I am aware no knives have been made with straight dovetails on the side of even thickness, and reduced between the bearing, so as to drop into the grooves loosely, and secured firmly in the grooves when pressed up by the action of the machine while in operation.

Having thus fully described the nature and object of this my invention, what I claim as new, and desire to secure by Letters Patent, in engines for preparing stock for making paper-pulp, is—

1. The knife J, when made with raised dovetails L L, of even thickness at the bearings or grooves in the roll, and reduced in thickness between them, to admit their dropping into the grooves loosely, substantially as herein described, and for the purpose set forth.

2. The stop-block H in the groove at the end of the roll, to prevent the knives from slipping out by the action of the machine, substantially as described, and for the purpose set forth.

3. The composition-metal sleeves N N on the journal-bearings of shaft I, to prevent corrosion of the shaft by the chemicals used in the pulp, substantially as described, and for the purpose hereinbefore set forth.

CHARLES BREMAKER.

Witnesses:
FRANK PARDON,
WM. T. ROSS.